United States Patent [19]

Tsuji et al.

[11] Patent Number: 4,664,595
[45] Date of Patent: May 12, 1987

[54] COMBINATION OF SLIDE MEMBERS

[75] Inventors: Seiichi Tsuji, Chiba; Kazuhiro Ogawara, Kanagawa; Shikuo Koide, Tokyo; Shotaro Mizobuchi, Kanagawa, all of Japan

[73] Assignee: Ebara Corporation, Tokyo, Japan

[21] Appl. No.: 651,039

[22] Filed: Sep. 14, 1984

[30] Foreign Application Priority Data

Sep. 30, 1983 [JP] Japan ................... 58-180649
Oct. 7, 1983 [JP] Japan ................... 58-186843
Oct. 17, 1983 [JP] Japan ................... 58-192539
Oct. 21, 1983 [JP] Japan ................... 58-196051
Jan. 9, 1984 [JP] Japan ................... 59-900

[51] Int. Cl.$^4$ ................. F04D 29/04; F16C 29/12
[52] U.S. Cl. ................. 415/170 R; 415/174; 384/222; 384/297; 384/907
[58] Field of Search .......... 415/170 R, 172 R, 174; 308/DIG. 8, 4 R; 384/129, 261, 282, 297, 907, 912

[56] References Cited

U.S. PATENT DOCUMENTS

| 2,590,761 | 3/1952 | Edgar .................... 308/DIG. 8 |
| 2,696,413 | 12/1954 | Wheildon, Jr. ............ 308/DIG. 8 |
| 3,424,065 | 1/1969 | Kurt et al. ............... 384/222 |
| 3,726,572 | 4/1973 | Beardmore ............... 308/DIG. 8 |
| 3,885,767 | 5/1975 | Olowinski et al. ......... 384/222 |
| 4,029,368 | 6/1977 | Tschirky et al. .......... 415/170 R |
| 4,089,566 | 5/1978 | Schmidt .................. 308/3 R |
| 4,128,278 | 12/1978 | Headen et al. ............ 384/222 |
| 4,518,205 | 5/1985 | Heathe ................... 308/4 R |
| 4,522,453 | 6/1985 | Lammer et al. ........... 308/DIG. 8 |

FOREIGN PATENT DOCUMENTS

57034 8/1973 Japan .
113648 9/1975 Japan .
133649 11/1976 Japan .

Primary Examiner—Robert E. Garrett
Assistant Examiner—Joseph M. Pitko
Attorney, Agent, or Firm—Wenderoth, Lind & Ponack

[57] ABSTRACT

A novel combination of sliding members operable both under dry (without lubrication) and wet (with lubrication) states, which comprises a first member made of a ceramic and a second member made of hard metal containing at least 75% by weight cemented carbide. This combination is useful as a bearing means in a pump of a vertical or inclined shaft type so as to permit actuation of the motor in the dry state and thereafter to continue operation of the pump with lubrication being provided by part of the liquid being pumped. In certain aspects, the ceramic member may be divided into a plurality of segments.

6 Claims, 15 Drawing Figures

COMBINATION OF SLIDE MEMBERS

FIELD OF INVENTION

The present invention relates to a combination of slide members and more particularly to such a combination which permits smooth sliding movement of one member relative to the other member in the dry state as well as the wet state.

BACKGROUND OF INVENTION

In some apparatuses, sliding movement between two members is required under different conditions such as the state of being lubricated as well as that without lubrication, or in the dry state as well as the wet state.

A typical example of such apparatus may be bearings employed in a pump of a vertical shaft type or an inclined shaft type. In such a pump, a motor is usually disposed at a high position above the water level and a long shaft extends from the motor to a pump section submerged within the water. The long shaft is intermediately supported by bearings and such bearings are to be lubricated for rotatably supporting the shaft, the lubrication being usually effected by self-pumped water or water supplied externally from an auxiliary source. Therefore, such bearings are kept in the dry state when the pump is not operating. On the other hand, if one wishes to operate the pump, it would be necessary to supply water to the bearings in advance of actuating the motor, since otherwise the bearings, which are usually made of rubber, would seize.

Therefore, it has been desired to provide a novel combination of sliding members which permits relative sliding movement in the dry state as well as the wet state.

Heretofore, bearings made of graphite, sintered alloy containing graphite or fluorine-containing polymers (Trade Mark: Teflon) have been available which permit the initiation of rotation without lubrication. However, such bearings are easily and quickly worn compared to the conventional rubber bearings used in this type of pump.

Also, there are other types of bearings such as an oil impregnated type which allows rotation without supplying lubricant from outside. However, this type of bearing is not suitable for use in the pump discussed above in both the dry and wet states.

Further, in addition to the problem regarding abrasion, corrosion has also been a problem in the bearings used in the pumps described above, the corrosion being mostly due to the contact potential between the different metals.

It is also evident that a conventional roller bearing cannot withstand use under both dry and wet states.

Therefore, it has been desired to obtain a novel combination of sliding members which is capable of effecting smooth movement between each member in both the dry and wet states, and has a long service life.

SUMMARY OF INVENTION

Accordingly, it is an object of the present invention to provide a novel combination of sliding members which is operable such as to effect smooth sliding motion between the members in the dry state as well as the wet state.

It is a further object of the present invention to provide a combination of sliding members which can withstand abrasion and corrosion, thereby providing a long service life.

It is also an object of the present invention to materialize this combination in forms which are usable in industry such as in the mode of bearings.

It is another object of the present invention to provide a novel combination of slide members which can be operated within a slurry and/or sea water while satisfying the features of anti-abrasion and anti-corrosion.

The objects above are accomplished according to the present invention.

The combination of the slide members according to the present invention comprises a first member made of a ceramic and a second member made of hard metal preferably containing at least 75% of cemented carbide by weight. This combination permits relative sliding movement between the first and second members both in the dry and wet states. Accordingly, it is convenient to utilize such combination as a bearing means in a pump of the vertical shaft type or the inclined shaft type.

In cases where the novel combination is embodied as a bearing, it is preferable, due to the relevant mechanical properties and degree of easiness in fabrication thereof, to employ the ceramic member as a stationary member and the hard metal as a moving or rotatable member.

In a certain aspect of the novel combination as a bearing, the first member, (i.e. that made of a ceramic) may be made as a plurality of column shaped segments distributed in a circle in a ring shaped case member so that they are aligned in the axial direction of the ring shaped case member and the innermost generatrix each of the respective column segments makes what is substantially a line contact with the outer cylindrical surface of the second member.

Further objects and advantages of the present invention will become clear from the detailed description of the preferred embodiments in conjunction with the accompanying drawings.

DESCRIPTION OF PREFERRED EMBODIMENTS

Before explaining the present invention, it might be preferable to touch upon the conventional combination of the sliding members. For the sake of convenience, explanation will be given with respect to a pump of a vertical shaft type.

Figure 1:
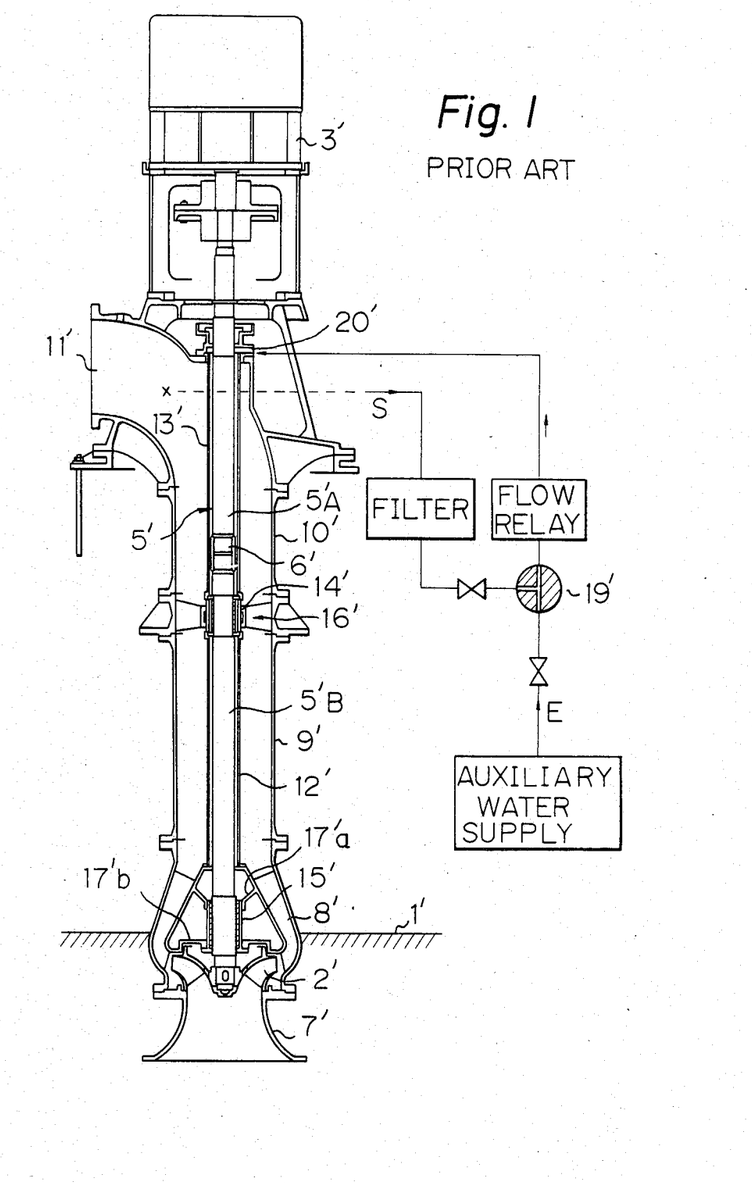
FIG. 1 is a schematic illustration of a pump of a vertical shaft type employing a combination of sliding members (a bearing means) constructed according to the prior art.

Referring to FIG. 1, there is illustrated, in cross section, a conventional pump of a vertical shaft type for lifting water to a higher position.

An impeller 2' of the pump is disposed below the water level 1'. A motor 3' for driving the pump impeller is disposed at a high position so that maintainance therefor is easily effected. The rotation of the motor 3' is transmitted to the impeller via a long shaft 5' which may comprise plural shafts coupled together, such as an upper shaft 5'A and a lower shaft 5'B coupled by a shaft coupling 6'. Upon rotation of the impeller 2' through the shaft 5', water is sucked through a suction mouth 7', passed through a discharge bowl 8', and depending tubes 9' and 10', and discharged from a discharge elbow 11'. The shaft 5' is rotatably supported by an upper bearing 14' and a lower bearing 15' which are supported by a bearing support 16' and ribs 17'a and 17'b, respectively. Protective tubings 12' and 13' are disposed to surround the shaft 5' (5'A 5'B). The protective tubings 12' and 13' are arranged to direct water to the bearings 14' and 15' through an intake port 20' from an external supply line "E" coupled to an auxiliary water supply such as a combination of an additional pump and water source before actuating the motor 3' so as to prevent the seizure of the bearings. A flow relay may be disposed at the position upstream of the intake port 20' so that the flow relay may actuate the motor 3' at a predetermined time after initiation of the supply of water through the line "E" or stop the motor when the flow rate of the water is not sufficient to lubricate the bearings 14' and 15'. After the actuation of the impeller 2', the pumped water may be diverged to a self supply line "S" which may be led to the inlet port 20' through a filter and a three-way valve 19' stopping the supply line "E". At each of the portions of the shaft 5' corresponding to the bearings 14' and 15', a stainless sleeve is fitted over the shaft 5' and this portion is borne by the bearing 14' or 15'. The bearings 14' and 15' are conventionally made of rubber molded in a tubular form wherein a plurality of axial grooves are provided in the inner bore of the bearing. Other material such as bronze containing lead, etc. has also been used.

Rubber has been a suitable material for the bearings used in the pump illustrated in FIG. 1 from the view points of anti-abrasion and endurance life; however, it is not able to permit operation of the bearing in both the dry state and the wet state whereby the introduction of water to the bearings in advance of the actuation of the motor has been necessary. While in the illustrated pump in FIG. 1, only two bearings 14' and 15' are shown, there may be a greater number of bearings required in a case where a longer vertical shaft is employed.

Such a long shaft also involves the necessity of long protective tubings thereby increasing the total size and weight of the pump which results in the increase of the installation and maintenance cost thereof. The situation above with its attendant problems would also apply if the pump is of the inclined shaft type.

As explained above, there has been no suitable combination of sliding members which permit relative sliding in the dry state as well as the wet state. Therefore, in pumps such as that shown in FIG. 1, troublesome steps have been needed before actuation thereof.

Further, the combination of the prior art represented as bearings in FIG. 1 has not been completely satisfactory. For example, combinations such as (rubber bearing—stainless steel sleeve), (Teflon bearing containing carbon—stainless steel sleeve) etc. are satisfactory under the wet state with clean water; however, the above combinations are not operative in the dry state. Also, other combinations such as (carbon bearing—stainless steel sleeve), (copper alloy bearing containing carbon—stainless steel sleeve) etc. are not completely satisfactory since these are easily abraded by sand or grains of alumina contained in the water whereby the endurance life of the sliding surfaces is not expected to be long enough.

In order to achieve the objects of the present invention, the inventors have conceived a novel combination which is characterized in that it comprises a hard metal (cemented carbide) and a ceramic. To confirm the characteristic features of the novel combination, the inventors constructed the testing equipment illustrated in FIG. 2 and performed comparative tests for several combinations of sliding members while varying the testing conditions so as to resemble actual operating conditions.

Figure 2:
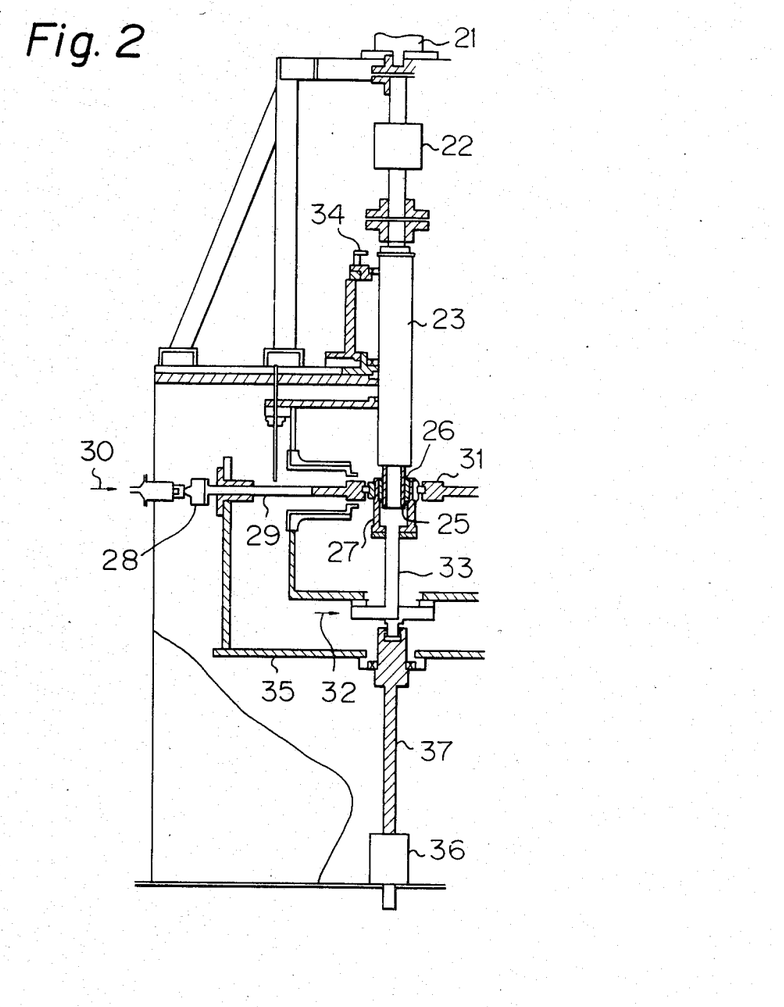
FIG. 2 is a schematic illustration of testing equipment for evaluating several combinations of sliding members with varying testing conditions.

A combination of sliding members for testing were prepared as an outer ring member 26 and an inner rotor member 25, as shown in FIG. 2, in simulation of a bearing and a shaft rotatably supported by the bearing, respectively. The testing equipment illustrated in FIG. 2 was constructed as follows. A vertical shaft 23 is rotatably supported and arranged to be driven by a hydraulic bydraulic motor 21 through a torque meter 22. At the lower end of the shaft 23, the shaft 23 is dimensioned so that the inner rotor member 25 is securely fitted thereover so as to be driven together with the shaft 23 by the motor 21. The outer ring member 26 is stationarily received in a bearing housing 27 so that, upon actuation of the motor 21, sliding rotation is effected between the inner surface of the outer ring member 26 and the outer surface of the inner rotor member 25. A testing radial load is applied in the direction of an arrow 30 to a retaining member 31, which retains the bearing housing 27, through a load cell 28 and a rod 29. A flexible hose 33 is coupled to the bearing housing 27 to supply liquid thereto from a source 32. A tachometer 34 is installed for measuring the rotational speed of the shaft 23. The bearing housing 27 supporting the outer ring member 26, the load cell 28, the rod 29, the retaining member 31 and the hose 33, etc. are supported by a test bath 35 which is supported by a rod 37 of an up-and-down mechanism so that the ring member 26 may move up and down, the inner rotor member 25 may rotate and the liquid may be introduced between the members 25 and 26.

With the testing equipment shown in FIG. 2, several combinations of sliding members made of various materials were tested and the evaluation of the tests are summarized in Table I.

TABLE I

| | Materials | | Coefficient of Friction | | Evaluation | | | | |
|---|---|---|---|---|---|---|---|---|---|
| | | | | | Dry Air | Wet | | | |
| No. | Outer Ring Member (Bearing) | Inner Rotor Member (Shaft) | Dry Air | Wet Clean Water | | Clean Water | Slurry | River Water plus Slurry | Sea Water plus Slurry |
| 1 | $Si_3N_4$ Ceramic | Hard Metal (WC 89%) | 0.04 | 0.02 | α | α | α | α | α |
| 2 | SiC Ceramic | Hard Metal (WC 89%) | 0.35 | 0.03 | β | α | α | α | α |
| 3 | $Si_3N_4$ Ceramic | Hard Metal (WC 87%) | 0.06 | 0.02 | α | α | α | α | α |
| 4 | SiC Ceramic | Hard Metal (WC 87%) | 0.35 | 0.03 | β | α | α | α | α |
| 5 | SiC Ceramic | Hard Metal (WC 75%) | 0.37 | 0.05 | β | α | α | β | α |
| 6 | Rubber | Stainless Steel | seizure | 0.03 | δ | α | γ | δ | γ |
| 7 | Carbon | Stainless Steel | 0.05 | 0.03 | α | β | δ | δ | δ |
| 8 | $Si_3N$ Ceramic | $Si_3N_4$ Ceramic | 0.58 | 0.61 | γ | δ | δ | δ | δ |
| 9 | $Si_3N_4$ Ceramic | Stainless Steel | seizure | 0.67 | δ | δ | δ | δ | δ |
| 10 | Hard Metal (WC 92%) | Stainless Steel | seizure | 0.68 | δ | δ | δ | δ | δ |
| 11 | Hard Metal (WC 92%) | Hard Metal (WC 92%) | 0.09 | 0.07 | β | α | α | β | γ |
| 12 | SiC Ceramic | Hard Metal Padding | 0.40 | 0.11 | δ | β | β | γ | δ |
| 13 | $Si_3N_4$ Ceramic | Copper Alloy (containing Carbon) | 0.04 | 0.03 | β | β | β | δ | γ |

The data regarding these test are as follows:
Dimension of Sliding Members:
  Outer Ring Member (Bearing)
    Inner Diameter: 60.3 mm
    Axial Length: 10 mm
  Inner Rotor Member (Shaft)
    Outer Diameter: 60.0 mm
    Axial Length: >10 mm
  Materials employed
    Hard Metal: Hard Metal Alloy containing cemented carbide WC as indicated (JIS-H-5501 G-3)
    Stainless Steel: SU 304
    Hard Padding Material: Padding Material containing 35% WC
Liquid prepared for tests:
  Slurry Water: Water containing by weight 0.3% $SiO_2$ having mean grain size of 80μ and max. grain size of 100μ.
  River Water and Slurry: Water containing by weight 0.3% River Sand and 0.3% $Al_2O_3$ having mean grain size of 80μ and max. grain size of 100μ.
  Sea Water and Slurry: Sea Water containing by weight 0.3% $SiO_2$ having mean grain size of 80μ and max. grain size 100μ.
Evaluation Symbol:
  α: Satisfactory Endurance: service life of over 16,000 hrs. could be expected
  β: Utility in Practical Use: service life of over 8,000 hrs. could be expected
  γ: Might be used depending on conditions. Conditions are subject to wide variation in terms of wear, corrosion, etc.
  δ: Not Usable These evaluations were made on the basis of amount of wear, appearance of corrosion and coefficient of friction etc. For example, "α" was given to cases where comparative wear* is less than $10^{-9}$ mm$^3$/kgf.mm, and friction of coefficient under wet condition is less than 0.05.

*The comparative wear is defined as "amount of wear (volume) vs. (unit sliding distance)×(load per unit area)".

Figure 3:
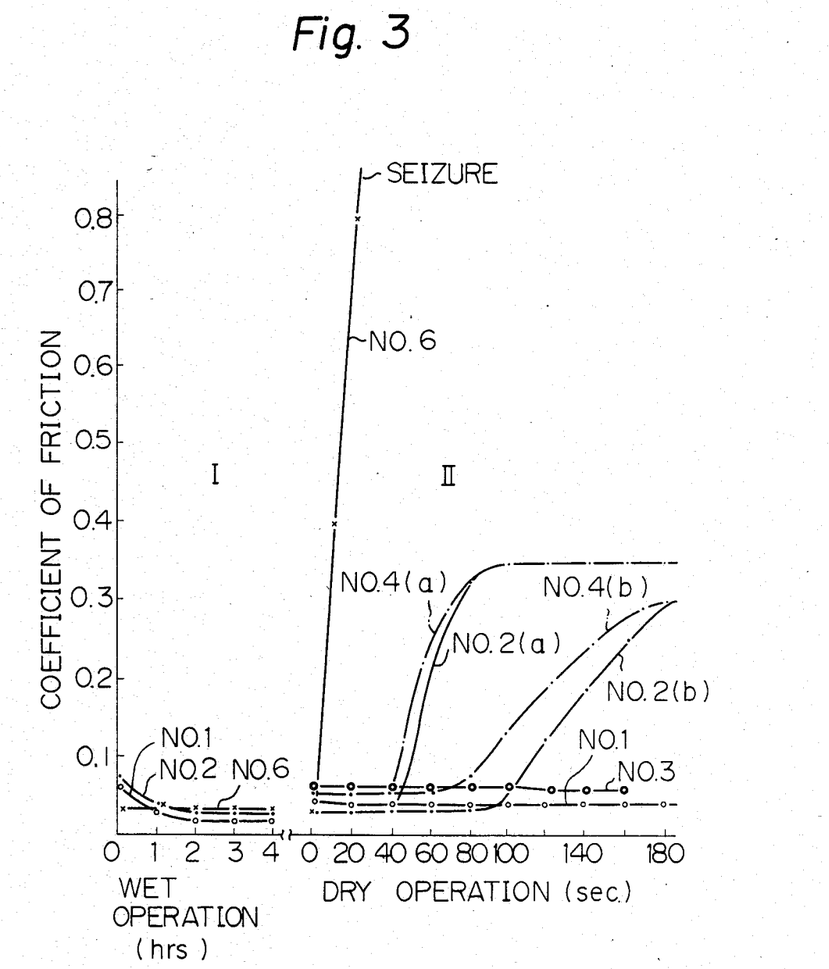
FIG. 3 shows curves of coefficient of friction for the various combinations tested by the equipment shown in FIG. 2.

Test Data is also shown in FIG. 3 with respect to coefficient of friction. In the ordinate, the coefficient of friction is shown and time elapsed is shown in the abscissa. Part I of the FIG. 3 relates to data wherein the bearing is supplied with water (i.e. in the wet state) while Part II thereof relates to data obtained where there was no water supply (i.e. in the dry state). It is to be noted that the unit of time applying in each abscissa of Part I and Part II is different. The numbers appearing in this FIG. 3 corresponds to those shown in Table I. The tests were conducted at a relative sliding speed of 2.5 m/sec with the radial load (in the direction of the arrow 30 in FIG. 2) of 6.3 kgf for No. 6, 67 kgf for No. 1, No. 2(a), No. 3 and No. 4(a) and 42 kgf for No. 2(b) and No. 4(b). (No. 6 represents the prior art.) It is noted that 4(a) and 4(b) refer to No. 4 with the difference of applied load as indicated above.

As is clear from Table I and FIG. 3, the combination of cemented carbide containing more than 75% tungsten carbide (WC) by weight and a ceramic (either $Si_3N_4$ or SiC) exhibited a very stable sliding feature under both dry and wet (clean water, slurry, river water plus slurry or sea water plus slurry) conditions. The combinations of No. 1 through No. 5 are regarded to be the essence of the present invention. While the cemented carbide used in the test was tungsten carbide of JIS-H-5501 G-3, it is not so limited as to necessarily meet this specification, the essential provision being only that it contains more than 75% WC by weight. Also, other cemented carbides such as those containing TiC, $Cr_3C_2$, etc. may also be used in this invention.

With regard to practical application of the novel combination, a ceramic member may preferably be installed as the member at the side of easy of installation in view of its particular mechanical properties, such as tensile strength, coefficient of linear expansion, etc. For instance, when applied in a pump of the vertical shaft type similar to that shown in FIG. 1, the ceramic member is preferably installed as on the bearing member side and a hard alloy or cemented carbide member is preferably employed as a rotating side member rotatable within the bearing.

Figure 4:
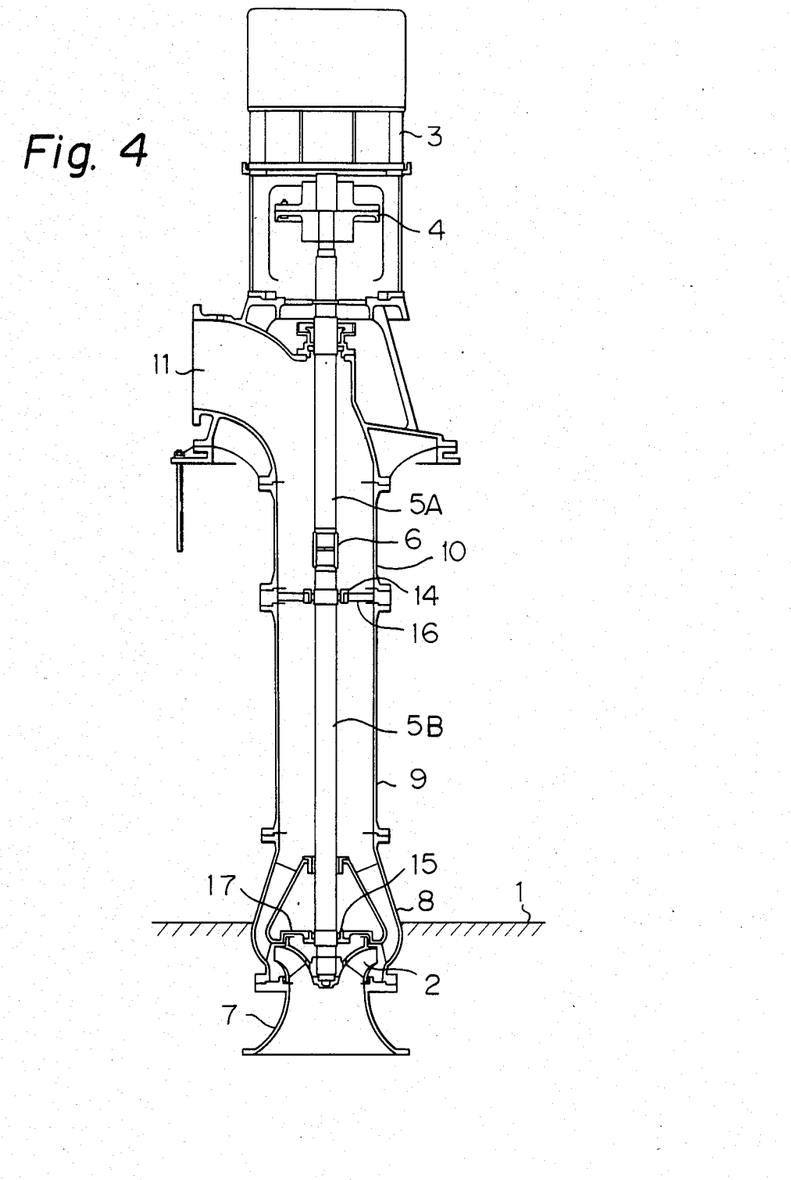
FIG. 4 is an illustration of a pump of a vertical shaft type incorporating the combination of sliding members according to the present invention as a bearing means.

In FIG. 4, there is shown a pump of a vertical shaft type in which the novel combination of sliding members according to the present invention is incorporated. For the sake of convenience, the same references as those employed in FIG. 1 are employed in FIG. 4, with prime omitted, for those parts which are similar to those in FIG. 1. As is clear from FIG. 4, protective tubings similar to tubings 12' and 13' are not required in this pump and there is no need to provide an inlet port similar to 20'. Therefore, an auxiliary water source, and lines "S" or "E" are not required in this pump either. Further, as explained in connection with FIG. 3, the novel combination of sliding members according to the present invention is able to withstand radial loads more than ten times greater than the load imposed on the combination of the prior art. Therefore, it is possible to make the sizes of bearing members small whereby a support member 17 for the lower bearing 15 may be made simple and compact as compared to ribs 17'a and 17'b shown in FIG. 1, and the support member 16 may also be made compact.

Figure 5:
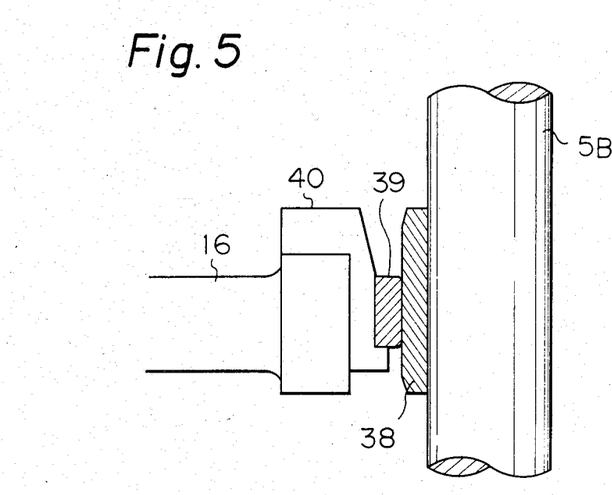
FIG. 5 is a fragmentary sectional view of the upper bearing shown in FIG. 4.

FIG. 5 illustrates a fractional enlarged view of the portion of the upper bearing 14 shown in FIG. 4. The bearing 14 consists of a sleeve 38 of cemented carbide and a ring member 39 of a ceramic. The ring member 39 is fitted into a bearing case 40 by means of, for example, a shrinkage fit. The case 40 is supported in place by the support member 16 which may comprise a group of stays. The sleeve 38 may be fixed to the shaft 5A by means of, for example, set screws (not shown). Incidentally, the axial length of the sleeve 38 is shown as being longer than the axial length of the ring member 39; however, they may be made to have the same axial length.

In using the novel combination of sliding members according to the present invention, contact current due to the contact potential difference between the sliding members is little or substantially negligible whereby corrosion derived from such contact current would be negligible. Therefore, if such combination according to the present invention is introduced into the pump of a vertical shaft type, such as that shown in FIG. 4, or the pump of an inclined shaft type, the construction of the pump would become simple and it would withstand operation even within sea water, with a long service life. Further, it is intended that such pump employing the combination of the sliding members according to the present invention may be actuated in the dry state and, thereafter, the liquid pumped thereby may serve as the lubricant for the sliding members thus providing long endurance even when the liquid contains grains or when the pump is operated within sea water. Thus, repeated operation under dry and wet states is also made easy.

Figure 6:
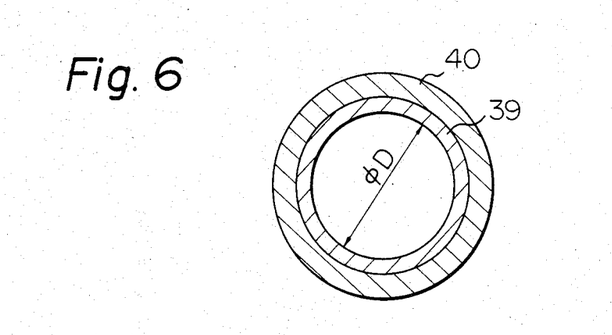
FIG. 6 shows a cross section showing the first member with its casing member.

A plan view of the ring member 39 and the bearing case 40 is shown in FIG. 6. The ring member 39 is normally installed in the case by shrinkage fit. In this way, in order to accommodate variations in the shaft size, it is necessary to prepare rings having several sizes of inner diameter $\phi$D. Such approach whereby several different sizes of ceramic rings are prepared in expensive since several molds compatible to the various sizes must be provided to produce rings. Also, it has been difficult to fabricate a large ceramic ring with required accuracy.

To cope with such situations and to provide an economical approach, employment of segmented pieces of ceramics in a circular arrangement has been conceived by the inventors. As previously explained, due to their respective mechanical properties, the inventors selected the stationary side member, that is the ring member in this case, to be made of a ceramic and the moving side member, that is the sleeve on the shaft, to be made of cemented carbide. However, it is hard to perform any work such as applying mechanical drilling or cutting to the ceramic for the purpose of making some mechanical fastening such as by means of screws, etc. Therefore, the inventors conceived the employment of a shrinkage fit in this regard while use of an adhesive was also applied.

Figure 7A:
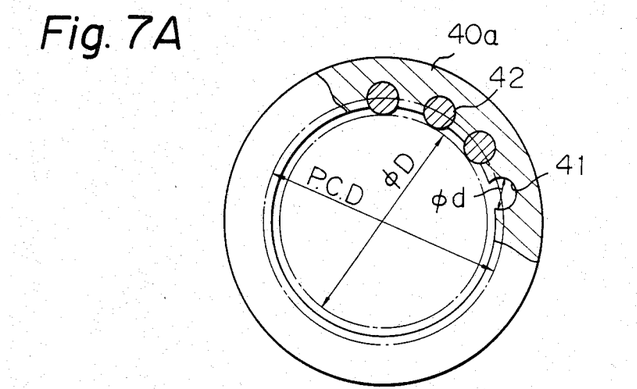
FIGS. 7A and 7B show a plurality of segments installed in the casing member in a horizontal cross section and a vertical cross section, respectively.
Figure 7B:
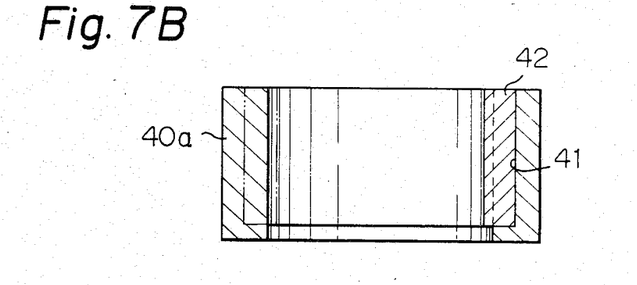

In FIGS. 7A and 7B, an embodiment of the bearing case 40a comprising plural segments 42 of a ceramic is shown in cross section in a plan view and a side view, respectively. Each of the segments 42 is made of a ceramic in a cylindrical column shape. In the ring shaped case member 40a, a plurality of holes 41 are drilled on a pitch circle and are equally spaced from each other. The pitch circle has a diameter of PCD and the diameter $\phi$d of the holes 41 is arranged to receive the segment 42 by shrinkage fit thereinto. Further, as shown in FIGS. 7A and 7B, the relationship between PCD and the diameter $\phi$d is determined so that the segments 41 are held in the case member 40a while a part of each segment is exposed inside of the inner diameter of the case member 40a to make a circle having a desired diameter of $\phi$D which inscribes each of the innermost generatrix of the column shaped segments when they are installed in place. With such a construction as explained above, the case members 40a with ceramic segments are easily prepared to accommodate several values of $\phi$D by varying the relationship between PCD and $\phi$d.

Figure 8:
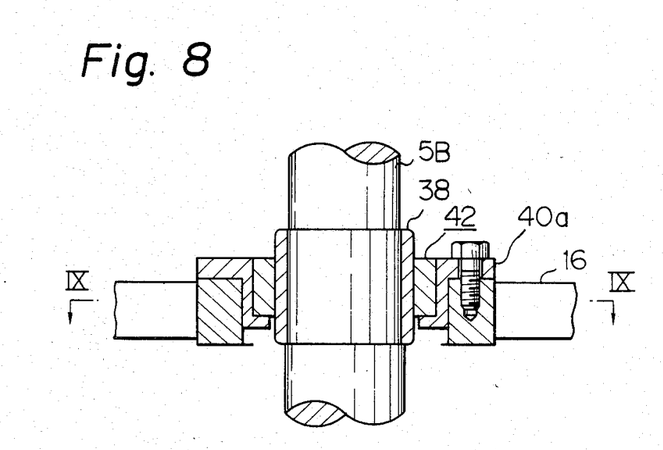
FIG. 8 illustrates a mode of installation of the bearing employing the construction shown in FIGS. 7A and 7B.
Figure 9:
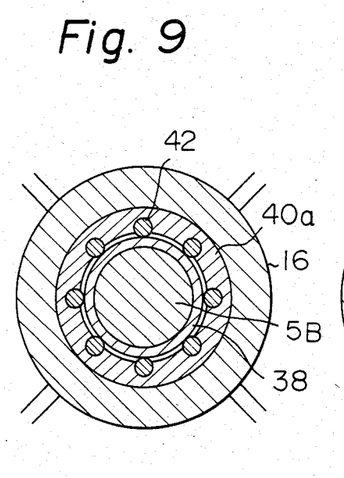
FIG. 9 shows a cross sectional view taken along the line IX—IX indicated in FIG. 8.

The installation of the case member 40a together with the column segments 42 onto the pump shown in FIG. 4 is shown in FIG. 8 and its horizontal cross section along line IX—IX is shown in FIG. 9. The contact between the sleeve 38 of hard metal and each of the segments 42 is substantially a line contact.

Figure 10A:
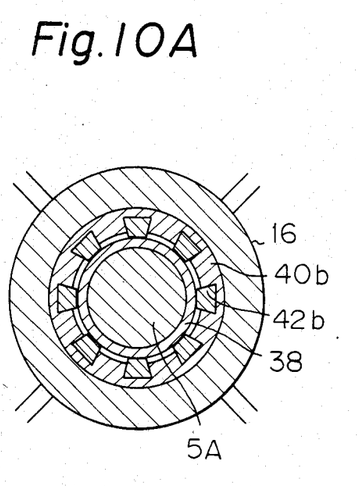
FIGS. 10A, 10B and 10C illustrate sections similar to that shown in FIG. 9 with modifications to the configurations of the segments.
Figure 10B:
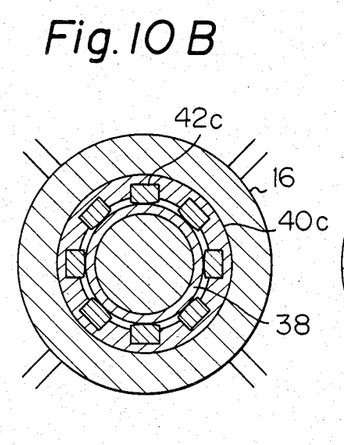
Figure 10C:
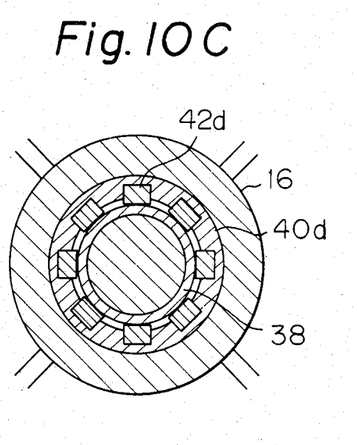

While the segment 42 has been explained as a cylindrical column shape, it may take an alternate form such as those shown in FIGS. 10A, 10B and FIG. 10C wherein, instead of the cylindrical column shape segments 42, a trapozoidal column segment 42b, a rectangular column segment 42c having an arcuate surface facing inside and a square column segment 42d are shown. These segments may be fitted in place by shrinkage fit or by means of adhesive. The cylindical column segments 42 may also be held in place by adhesive.

While several modifications of the cylindrical column segments 42 have been shown, it will be clear that the cylindrical column segments are preferable because fabrication of case member 40 and assembling segments 42 by shrinkage fit are relatively easy compared to those of the others.

With the employment of the segments explained referring to FIGS. 6 thru. 10c, the following advantages are achieved.

(1) Large sized bearings and/or various sized bearings may be manufactured economically.

If the large sized ceramic member is made unitarily, uniformity of the material is difficult to achieve and reliability of the mechanical strength of the large ceramic member might be questionable. However, the arrangement of seguments obviates such uncertainty. Also, it is easy to prepare several sizes by considering the relationship between PCD and holes or grooves for the segments.

(2) Because the contact between the shaft (sleeve) and the segments is regarded as substantially a line contact, generation of heat during operation in the dry state is minimized.

While the partial load per unit area would be high, the combination of the sliding members according to the present invention may withstand heavy loads more than about 10 times that borne by the bearing of the prior art, as explained in connection with FIG. 3.

(3) Because there are gaps between the adjacent segments, the liquid discharged from the pump upwardly passes these gaps and, therefore, entrainment into the sliding surfaces of foreign materials contained in the liquid such as sand is minimized, thereby further improving the anti-wear characteristics.

Figure 11A:
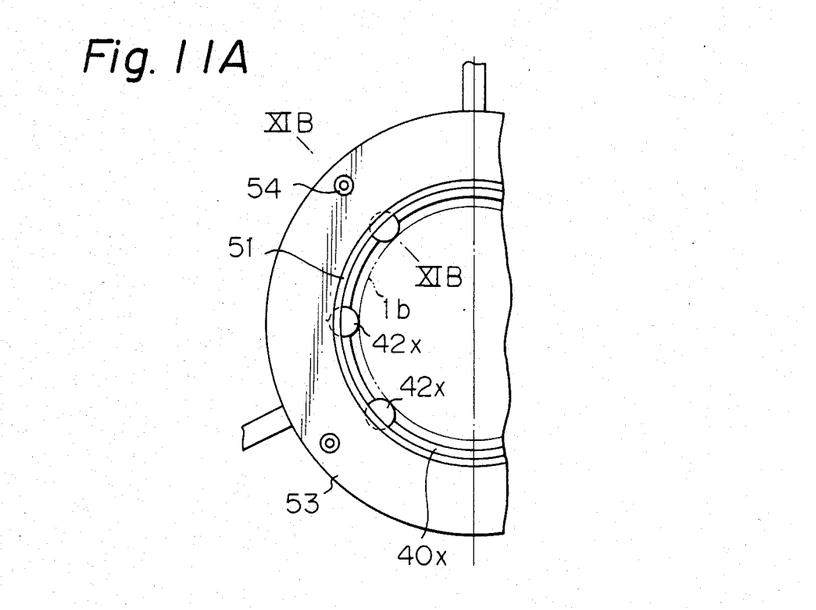
FIGS. 11A and 11B show another installation mode of the bearing.
Figure 11B:
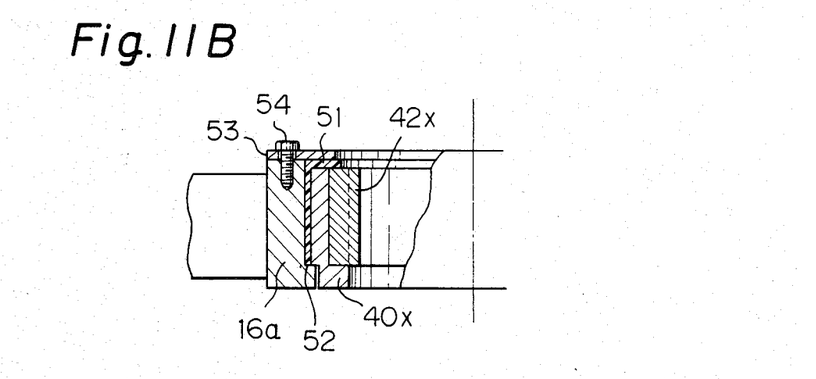

A modified installation of the combination of sliding members according to the present invention is illustrated in FIGS. 11A and 11B. In these drawings a cylindrical outer surface of a casing member 40x provided with a plurality of cylindrical column segments 42x is covered by an elastic member 51 made of such a material as rubber or the like. Suh assembly is received in a support member 16a while engaging a step portion 52 thereof. An annular cover 53 is secured at the top of the elastic member 51 by screws 54 which permits slight radial movement of the cover 53 with the resulting benefit of elasticity. By inserting the elastic member 51, the elastic member may absorb vibration by supplementing the ceramic member which may present brittleness under some conditions. The use of an elastic member for a combination having no arrangement for the segments is also applicable. The elastic member way be made independently from the casing member 40x or may be produced by coating. The the casing member. The present invention has been explained in detail referring to the specific embodiments; however, the invention is not limited to those embodiments explained hereinabove, and may be modified within the sprit and scope of the invention.

What is claimed:

1. A combination of sliding members adapted for use as a bearing means in a vertical shaft pump in which lubrication for said combination is effected by liquid provided by means of said pump, said combination comprising:

a ring member which is stationary and is made of ceramic selected from the group consisting of SiC and $Si_3N_4$; and a shaft member slidable and rotatable within sid ring member and made of hard metal including tungsten carbide in a ratio of at least 75% by weight.

2. A combination of sliding members as claimed in claim 1 wherein said ring member is installed in a case member by shrinkage fit.

3. A combination of sliding members as claimed in claim 2 wherein said case member is received in a support member with an elastic member interposed therebetween.

4. A combination of sliding members as claimed in claim 1 wherein said ring member consists of plural column segments installed in a ring shaped member and said shaft member is a sleeve secured to a shaft so that the outer surface of the shaft member makes substantially line contact with each of the column segments at its innermost generatrix.

5. A combination of sliding members as claimed in claim 4 wherein said column segments are installed in the ring shaped member in a plurality of longitudinal holes provided near the inner surface of said ring shaped member so that each of the segments expose a part thereof towards the inner diameter of the ring shaped member.

6. A pump of vertical shaft type comprising:

a pump section;

a motor section comprising an impeller, a volute chamber and delivery tubing extending upwardly from said volute chamber; and a vertical shaft extending from said motor section to said impeller for driving said impeller, said vertical shaft being partly encased within said tubing and rotatably supported by bearing means comprising a first member which is stationary and is made of ceramic selected from the group consisting of SiC and $Si_3N_4$, and a second member slidable relative to said first member and made of hard metal including tungsten carbide in a ratio of at least 75% by weight.

* * * * *